(12) United States Patent
Fan et al.

(10) Patent No.: US 7,569,641 B2
(45) Date of Patent: Aug. 4, 2009

(54) POLY(ETHYLENE-BUTYLENE) (METH)ACRYLATES AND RELATED COMPOSITIONS

(75) Inventors: Mingxin Fan, West Chester, PA (US); Jeffrey Allan Klang, West Chester, PA (US); Gary W. Ceska, Exton, PA (US); James Horgan, West Chester, PA (US)

(73) Assignee: Sartomer Technology Company, Inc., Wilmington, DE (US)

( * ) Notice: Subject to any disclaimer, the term of this patent is extended or adjusted under 35 U.S.C. 154(b) by 383 days.

(21) Appl. No.: 11/035,357

(22) Filed: Jan. 12, 2005

(65) Prior Publication Data

US 2005/0154121 A1 Jul. 14, 2005

Related U.S. Application Data

(60) Provisional application No. 60/536,454, filed on Jan. 14, 2004.

(51) Int. Cl.
- C08C 19/02 (2006.01)
- C08C 19/04 (2006.01)
- C08C 19/28 (2006.01)
- C08C 19/38 (2006.01)
- C08F 36/06 (2006.01)

(52) U.S. Cl. .......... 525/331.9; 525/333.2; 525/338; 525/385; 525/386

(58) Field of Classification Search .......... 525/331.9, 525/333.2, 338, 385, 386
See application file for complete search history.

(56) References Cited

U.S. PATENT DOCUMENTS

| | | | |
|---|---|---|---|
| 4,020,125 A | 4/1977 | Suzuki et al. | |
| 4,031,086 A | 6/1977 | Mori et al. | |
| 4,192,684 A * | 3/1980 | Gensho et al. | 430/284.1 |
| 4,587,201 A | 5/1986 | Morikawa et al. | |
| 5,405,911 A * | 4/1995 | Handlin et al. | 525/139 |
| 5,792,815 A | 8/1998 | Schwindeman et al. | |
| 6,146,706 A | 11/2000 | Verardi et al. | |

FOREIGN PATENT DOCUMENTS

JP 2002-371101 6/2004

* cited by examiner

*Primary Examiner*—Roberto Rábago
(74) *Attorney, Agent, or Firm*—Michael B. Fein; Cozen O'Connor

(57) ABSTRACT

A composition comprising a polymer according to Structure 1

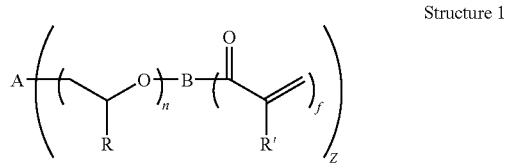

Structure 1 wherein R is H, Me, Et or $C_6H_5$; R' is H or Me; n is a number from 1 to 100; and Z is a number from 1 to 3; f is a number from 1 to 5, with f=1 if B is nothing; A is residue of a hydrogenated polybutadiene backbone; and B nothing or it is a difunctional organic linking group is disclosed. The composition can be cured and used in a wide range of articles such as a photopolymer printing plate, sealant, caulk, encapsulent, road marking paint, photoresist, binder, impact modifier, polymer modifier, oxygen or water vapor barrier coating, conformal coating, solder mask, pigment dispersion, stereolithograph, laminating resin, grafted co-polymer, composite, optical fiber coating, paper coating, metal coating, glass coating, plastic coating, wood coating, waterproofing material, electrical insulating material, automotive belt or hose, tire, engine mount, gasket, golf ball core, and rubber roll.

1 Claim, No Drawings

POLY(ETHYLENE-BUTYLENE) (METH)ACRYLATES AND RELATED COMPOSITIONS

CROSS-REFERENCE TO RELATED APPLICATIONS

Benefit of Provisional application Ser. No. 60/536,454, Jan. 14, 2004 is claimed, said application being incorporated by reference.

BACKGROUND OF THE INVENTION

This invention relates to poly(ethylene-butylene) (meth) acrylates, compositions comprising such polymers, methods of preparation, and methods of use.

Polybutadiene (meth)acrylates are well known articles of commerce. Examples include CN301, CN302 and CN303 from Sartomer Company. These products are used in radiation or peroxide cured inks, coatings, adhesives, printing plates and other applications. Beneficial properties imparted by these materials include high flexibility, low Tg, hydrophobicity, chemical resistance and adhesion to substrates. One drawback of these products is that they have limited oxidative stability with respect to weathering and heat ageing which has limited their use. In addition, the hydroxyl-terminated poly (ethylene-butylene) resins are not widely available and their (meth)acrylate derivatives and properties have not been studied. Urethane (meth)acrylates based on hydroxyl-terminated polybutadiene with alkylene oxide derived terminal hydroxyl groups have been described (U.S. Pat. No. 4,587,201; U.S. Pat. No. 4,031,066; Japanese Unexamined Patent 2002-371101, and references cited therein).

SUMMARY OF THE INVENTION

The invention in one aspect relates to compositions which comprise one or more (meth)acrylate-terminated, hydrogenated polybutadiene resins which comprise poly(alkylene oxide) groups and optional linking groups between the poly (alkylene oxide) groups and the terminal (meth)acrylate groups. These polymers have good in process stability and make products that are resistant to premature crosslinking or gellation. The polybutadienes have the structure of poly(ethylene-butylene) copolymers.

In another aspect, the invention comprises a method for preparing the (meth)acrylate-terminated, hydrogenated polybutadiene resins comprising alkoxylating a hydrogenated hydroxyl-functional polybutadiene resin and transesterifying the alkoxylated resin with a (meth)acrylate monomer.

The invention also comprises coatings, inks, and adhesives comprising the polymers; for example photopolymer printing plates, sealants, caulks, encapsulents, road marking paints, photoresists, binders, impact modifiers, polymer modifiers, oxygen or water vapor barrier coatings, conformal coatings, solder masks, pigment dispersions, stereo lithographs, laminating resins grafted co-polymers, composites, optical fiber coatings, paper coatings, metal coatings, glass coatings, plastic coatings, wood coatings, waterproofing materials, electrical insulating materials, automotive belt or hoses, tires, engine mounts, gaskets, golf ball cores, and rubber rolls.

The preferred polymers have a degree of alkoxylation, n, i.e., average number of alkoxy units per hydroxyl group, of 1 to 100, preferably from 1 to 30, and a about 1 to 15 terminal (meth)acrylic group per molecule, preferably about 1 to 6, and more preferably about 1 to 3, and most preferably 1.5 to 2.5. The alkylene oxide used can be any of those known in the prior art. Preferred examples include ethylene oxide, propylene oxide, butylene oxides, and styrene oxide. Most preferred are ethylene oxide, propylene oxide, and mixtures thereof. The number of alkylene oxide units can range from 1 to about 100 per reactive hydroxyl group. A preferred range is from 1 to about 30.

The polymers preferably have the formula:

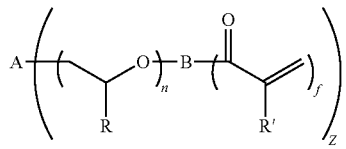

Structure 1 wherein R is H, Me, Et or $C_6H_5$; R' is H or Me; n is a number from 1 to 100; and Z is a number from 1 to 3; f is a number from 1 to 5, with f=1 if B is nothing; A is residue of a hydrogenated polybutadiene backbone; and B nothing (i.e., a simple bond) or it is a difunctional organic linking group which can be a residue of a difunctional organic group linked by one of the following two linking end groups: ester-ester, or urethane-ester.

The global functionality or the global number of (meth) acrylic terminal groups per molecule may be represented by the product of numbers f by Z (f.Z). Number f represents the number of (meth)acrylic groups per hydroxyl reactive group and the number Z represents the number of hydroxyl reactive groups per molecule (of alkoxylated hydrogenated polybutadiene).

The poly(ethylene-butylene) copolymer resin can be of any molecular weight and its microstructure is not critical to the invention, it is derived from the hydrogenation of hydroxyl-terminated polybutadiene. Molecular weights in the range of 500 to 10,000 Daltons are preferred. For polybutadiene resins, microstructure refers to the amounts 1,2-vs. 1,4-addition and the ratio of cis to trans double bonds in the 1,4-addition portion. The amount of 1,2-addition is often referred to as vinyl content. The vinyl content of the polybutadiene can range from about 5% to about 90%. The ratio of cis to trans double bonds can range from about 1:10 to about 10:1. The average number of reactive terminal hydroxyl groups per molecule which is represented by Z can range from about 1 to 3. A preferred range of Z is from about 1.5 to 2.5.

DETAILED DESCRIPTION

The compositions of the invention can be used in preparing coatings, inks or adhesives cured by UV or EB radiation, peroxides or Michael addition.

The alkylene oxide can be incorporated into the polybutadiene resin by either an "in situ" procedure or in a secondary reaction step between an isolated polybutadiene resin and an alkylene oxide. The in-situ procedure would be used in the case where the polybutadiene resin is made by anionic polymerization and the alkylene oxide is added to the active polymerization mixture. In the case where the alkylene oxide is added in a secondary reaction step, the polybutadiene resin could be made by anionic or free radical polymerization. The alkylene oxide could be incorporated by any of the methods known in the art for effecting alkoxylation of alcohols, diols or polyhydroxylic materials.

The (meth)acrylate ester can be introduced or formed by transesterification, direct esterification, reaction with (meth)

acrylic halides or anhydrides; by urethane reaction, for example by reacting the hydroxyl terminated alkoxylated hydrogenated polybutadiene with a diisocyanate and a hydroxyl functional (meth)acrylate; and by reacting with cyclic acid anhydride followed with epoxide- or hydroxyl-containing (meth)acrylates or diepoxides and (meth)acrylic acid. Transesterification, direct esterification, and urethane reaction are the preferred industrial methods.

For example, the polymer according to the invention may be prepared by a transesterification reaction between the alkoxylated hydrogenated hydroxyl-terminated polybutadiene resin and a low molecular weight (meth)acrylate ester, such as: methyl (meth)acrylate, ethyl (meth)acrylate, n- or iso-propyl (meth)acrylate, or n-, iso-, or tert-butyl (meth)acrylate.

The said transesterification reaction is preferably catalyzed by a metal alkoxide, metal oxide, Lewis acid, or other catalysts or combinations known in the art to catalyze transesterifications.

Another possibility is the direct esterification of alkoxylated hydrogenated hydroxyl-terminated polybutadiene resin with acrylic and/or (meth)acrylic acid, in which case the reaction may be catalyzed by sulfuric acid, para-toluenesulfonic acid, methanesulfonic acid, or other strong mineral or organic acids known to catalyze esterification reactions.

In both cases of transesterification or of direct esterification processes, f=1 and the number of (meth)acrylic groups per molecule f.Z corresponds to the number Z of reactive hydroxyl groups, which ranges from about 1 to 3 and preferably from 1.5 to 2.5.

When the urethane reaction is used for introducing the (meth)acrylate terminal groups the said reaction occurs between the alkoxylated hydrogenated hydroxyl-terminated polybutadiene resin with a diisocynate and an hydroxyl functional (meth)acrylate.

The said diisocyanate may be selected from isophorone diisocyanate, toluene diisocyanate, diphenylmethylene diisocyanate, hydrogenated diphenylmethylene diisocyanate, hexamethylene diisocyanate and their derivatives, while the said hydroxy functional (meth)acrylate may be selected from: hydroxyethyl (meth)acrylate, hydroxybutyl (meth)acrylate, hydroxypropyl (meth)acrylate, pentaerythritol triacrylate, trimethylolpropane diacrylate.

The polymers can be prepared by a process which comprises (A) alkoxylation reaction of a hydrogenated hydroxyl-functional polybutadiene resin with an alkylene oxide; (B) transesterification reaction of the resulting alkoxylated resin of step a), with a low molecular weight (meth)acrylate. The transesterification conditions may be selected as defined above.

In a second alternative process, the first step (A) remains unchanged, with the second one (B), replaced by a direct esterification reaction of the resulting alkoxylated resin of step (A), with acrylic or methacrylic acid.

In a third process option, the second step (B) is replaced by a urethane reaction of the resulting alkoxylated resin of step (A), with a diisocyanate and an hydroxyl functional (meth)acrylate, which may be selected according to conditions as defined above.

Cured compositions of the invention can be prepared by curing the polymer compositions which comprise at least one polymer as defined above. The curable compositions may be heat-cured (including P-curable) or radiation cured (UV-curable or EB-curable or high energy radiation-curable).

The invention also comprises articles comprising the above-described cured composition. Such articles or cured compositions may be in the form of, or used as a photopolymer printing plate, sealant, caulk, encapsulent, road marking paint, photoresist, binder, impact modifier, polymer modifier, oxygen or water vapor barrier coating, conformal coating, solder mask, pigment dispersion, stereo lithograph, laminating resin, grafted co-polymer, composite, optical fiber coating, paper coating, metal coating, glass coating, plastic coating, wood coating, waterproofing material, electrical insulating material, automotive belt or hose, tire, engine mount, gasket, golf ball core, and rubber rolls. Consequently, such specific uses of the said polymer or of the compositions comprising such a polymer are also part of the present invention.

EXAMPLES

A 1 liter multi-neck round bottom flask fitted with a mechanical agitator, thermocouple, and Dean-Stark trap was charged with heptane (240 g), acrylic acid (18 g), methanesulfonic acid (4.1 g), hydroquinone monomethyl ether (0.6 g) and a ethoxylated hydrogenated hydroxyl-terminated polybutadiene resin with Mn of about 3000 (337 g), with hydroxyl functionality Z of about 2, corresponding to 37 mgKOH/g. The ethoxylation degree n per hydroxyl group ranges from 1 to 3 with an average n of about 2 ethoxy (EO) units per hydroxyl. The mixture was heated to reflux to remove water of reaction and reflux was maintained until water production stopped. After removal of the strong acid catalyst, solvent and excess acrylic acid the final product was obtained as a viscous light brown liquid with the following properties: Brookfield viscosity at 60° C. of 1990 mPa·s (1990 cP) and APHA color of 200.

Example 2

A 3 liter multi-neck round bottom flask fitted with a mechanical agitator, thermocouple was charged with isophorone diisocyanate (244.2 g), dibutyltin dilaurate (2.5 g), hydroxyethyl acrylate (127.6 g), hydroquinone monomethyl ether (6.0 g). To this mixture an ethoxylated hydrogenated hydroxyl-terminated polybutadiene resin with Mn of ca. 3000 (1672 g), with hydroxyl functionality Z of about 2 corresponding to 37 mg KOH/g, was added slowly. The ethoxylation degree n per hydroxyl group ranges from 1 to 3 with an average n of about 2 ethoxy (EO) units per hydroxyl. The mixture was heated and mixed at 80° C. for 6 hours. The final product was obtained as a viscous clear liquid with the following properties Brookfield viscosity at 60° C. of 70200 mPa·s (70,200 cP) and APHA color of 100.

While the invention has been described and illustrated in detail herein, various alternatives, modifications, and improvements should be readily apparent to those skilled in this art without departing from the spirit and scope of the invention. The present invention, therefore, is well adapted to carry out the objects and attain the ends and advantages mentioned, as well as others inherent therein. Although the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those of ordinary skill in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A process of preparation of a composition comprising one or more (meth)acrylate-terminated, hydrogenated polybutadiene resins which comprise (alkylene oxide) groups and optional linking groups between the (alkylene oxide) groups and the terminal (meth)acrylate groups; comprising the steps of:

(A) alkoxylation reaction of a hydrogenated hydroxyl-functional polybutadiene resin with an alkylene oxide; and (B) transesterification reaction of the resulting alkoxylated resin of step (A), with a low molecular weight (meth)acrylate.

* * * * *